Jan. 4, 1949.  C. C. LAURITSEN ET AL  2,458,475
ROCKET DEVICE
Filed April 2, 1943
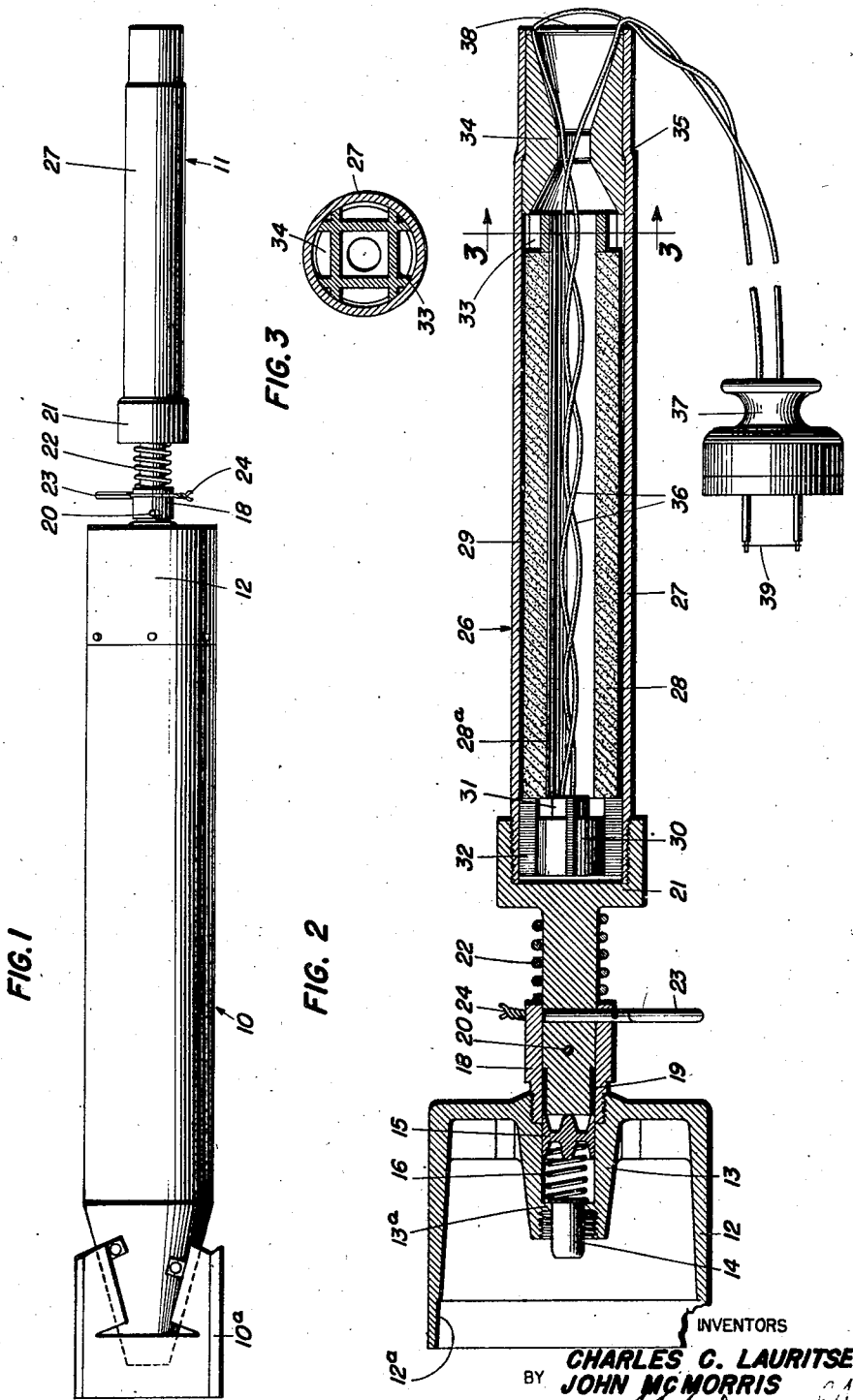
INVENTORS
CHARLES C. LAURITSEN
BY JOHN M<sup>c</sup>MORRIS
ATTORNEY Patented Jan. 4, 1949

2,458,475

UNITED STATES PATENT OFFICE 2,458,475

ROCKET DEVICE

Charles C. Lauritsen and John McMorris, Pasadena, Calif., assignors to the United States of America as represented by the Secretary of the Navy Application April 2, 1943, Serial No. 481,652

5 Claims. (Cl. 102—49)

1

This invention relates to rocket devices of the type which includes a rocket motor connected at its front end to a pay load adapted to be propelled by the motor. More particularly, the invention relates to a novel device of this type having means for automatically separating the rocket motor from the pay load during the flight of the device and after the driving force of the motor is substantially expended. The new rocket device is simple and compact in construction and positive in action.

One object of the invention resides in the provision of a rocket propelled device having a rocket motor and a pay load joined by a releasable connection which is broken by the propelling force of the motor, and means for positively separating the motor and pay load after the latter has been accelerated by the motor. In accordance with my invention, the motor and the pay load are joined by a releasable connection including a pair of relatively movable members which are normally held together by a shear pin, or the like. When the rocket is fired, the propelling force shears the pin and causes the connecting members to move relatively against the action of a spring until the forward movement of the motor relative to the pay load is arrested. As a result, the spring is stressed by the propelling force, and when the acceleration of the pay load by the motor is completed, the energy stored in the spring causes the connecting members to move apart and forcibly separates the motor and the pay load so that the latter continues its flight without encumbrance by the spent motor. With this construction, the spring not only separates the motor from the payload when the driving force of the motor is expended, but also cushions the application of the initial driving force to the payload and adds a slight additional impulse to the payload in separating it from the motor.

Another object of the invention is to provide a novel rocket device having a combustible charge driven by the rocket motor, and time delay means for igniting the charge and operable by the propelling force of the motor. In the preferred construction, one of the relatively movable members in the connection between the motor and the combustible charge actuates a firing pin to operate a semi-cap, or the like, upon initial relative movement of the members when the connecting pin is sheared by firing of the motor. The semi-cap then starts a delayed action fuze train to ignite the combustible charge.

These and other objects of the invention may

2 be better understood by reference to the accompanying drawing, in which

Fig. 1 is a side view of one form of the new rocket device;

Fig. 2 is a longitudinal sectional view of part of the device shown in Fig. 1;

Fig. 3 is a sectional view on the line 3—3 in Fig. 2.

The rocket device of my invention, as illustrated, is in the form of a jet propelled float light, although it will be understood that the invention may take other forms as well. The device is particularly adapted for use in airplanes, from which the float light 10 may be projected rearwardly by the rocket motor 11 to offset the forward velocity of the airplane, whereby the float light falls substantially vertically to mark a spot directly below the airplane at the instant the rocket is fired.

Referring to the drawings, the device there shown comprises a generally cup-shaped receptacle 12 which is open at its front end where it is formed with a socket 12a for receiving the rear end of the float light 10, the latter being secured to the receptacle in any suitable manner. In its rear end, the receptacle 12 is provided with a hollow axial boss 13 projecting into the receptacle, and a percussion cap 14 extends through the front end of the boss and has a head seated on a shoulder 13a in the boss. The percussion cap is adapted to be fired by a firing pin 15 slidable in the boss and normally urged rearwardly away from the cap by a compression spring 16. When the percussion cap is fired by the pin 15, it ignites a delayed action fuse train (not shown) in the receptacle 12 to initiate burning of the combustible charge in the float light 10. The delayed action fuse train may be of any desired type and forms no part of the present invention.

The boss 13 is open at its rear end and has a sleeve 18 threaded therein, the sleeve and the boss forming a cylinder in the receptacle. A plunger 19 is slidable in the cylinder and is normally connected to the sleeve by a shear pin 20. The plunger has a head 21 at its rear end, and a compression spring 22 is coiled around the plunger between the head and the rear end of the sleeve 18. A safety pin 23 extends transversely through the sleeve and the plunger and is held in position by a releasable wire 24 to lock the plunger in the sleeve.

The float light receptacle 12 is adapted to be propelled by the rocket motor 11 which may be of any desired construction. Preferably, the motor is of the type disclosed in a co-pending application of C. C. Lauritsen, Serial No. 481,045, filed April 2, 1943. More particularly, the motor comprises a hollow cylindrical body 27, which may be made of seamless tubing, threaded at its front end into the plunger head 21. Within the motor body is a cylindrical powder grain 28, such as ballistite, having an axial passage 28a. The powder grain is provided on its outer cylindrical surface with spaced longitudinal ribs 29 fitting closely against the inner wall of the motor body so as to support the grain in concentric relation therewith. In the front end of the body 27 is an igniter comprising a cylindrical casing 30, which may be made of a plastic material, having at its rear end a reduced portion 31 substantially smaller in cross section than the grain passage 28a, the reduced portion 31 being alined with the passage. The casing 30 is supported in the motor body on longitudinal ribs 32 integral with the casing and closely engaging the inner wall of the motor body. The ribs 32 are preferably alined with the grain ribs 29 and project rearwardly beyond the end of the casing 30 to engage the front end of the powder grain, whereby the grain is normally spaced from the casing 30 to provide an annular chamber around the reduced end portion 31. An electrically operable squib (not shown) is disposed in the casing 30 and its end portion which may also contain flash powder or black powder, or both, to expedite ignition of the grain. It will be understood that when the igniter 30 is energized, the resulting blast is communicated through the reduced end portion 31 and the surrounding annular chamber to the grain passage 28a and also to the space between the external ribs 29, so that the powder grain burns simultaneously on all surfaces.

At its rear end, the powder grain 28 is supported by a grid 33 which may be made up of two pairs of spaced, interconnected metal strips, each pair extending at right angles to the other, whereby the strips define a substantially square central opening alined with the grain passage 28a. The ends of the grid strips fit closely against the inner wall of the motor body so as to support the grid with its central opening in line with the passage 28a. A discharge nozzle 34 is mounted in the rear end portion of the motor body and abuts against the adjacent end of the grid, the nozzle being located axially in the motor by a shoulder 35.

The igniter 30 is adapted to be energized through wiring 36 extending through the grain passage 28a, the grid 33 and the nozzle 34, the outer ends of the wires being connected to a plug 37. Preferably, a fibre plug 38 is inserted in the nozzle 34 to seal the interior of the motor body and is provided with suitable slots for passage of the wires. In order to prevent accidental energizing of the igniter, the prongs of the electrical plug 37 are normally short-circuited by a shorting element 39 which is removed from the prongs prior to firing the rocket.

In the use of the new rocket device, the assembly including the motor 11 and the float light 10 is mounted on a suitable projector or guide which may be arranged in a cylindrical casing on the airplane. The casing is open at its outer end, which faces to the rear of the airplane, and may have a door through which the assembly is inserted. The shorting element 39 is removed from the plug 37, and the latter is inserted in a socket (not shown) which may be connected through a suitable operating switch to the current source. After mounting the assembly in the projector, the safety pin 23 is removed by twisting it to break the wire 24, so that the motor is connected to the float light receptacle 12 only by the shear pin 20.

When the device is to be fired, the operating switch is actuated to close the energizing circuit through the plug 37 and the igniter 30, whereupon the powder grain is ignited and propels the assembly along the projector guide in a direction opposite to the direction of flight of the airplane, breaking the wires 36. As soon as the motor 11 exerts a substantial propelling force on the receptacle 12, it shears the pin 20 and forces plunger 19 into the boss 13 against the action of springs 16 and 22. As a result, the springs are further compressed and the firing pin 15 is forced against the percussion cap 14 so as to fire the latter and start the fuse train in receptacle 12. When the powder grain 28 is completely burned and the motor no longer exerts a propelling force on the float light, the compressed spring 22 expands and moves plunger 19 out of the sleeve 18, thereby forcibly separating the motor from the receptacle 10. Thereafter, the float light including receptacle 12 falls into the water and provides illumination due to ignition of the combustible charge through operation of the delayed fuse train from the percussion cap 14. The float light may be provided with fins 10a for guiding it in its flight.

The motor 11 is preferably designed to develop propelling power sufficient to project the rocket assembly rearwardly from the airplane at a velocity substantially equal to the forward velocity of the airplane, so that when the float light is separated from the motor by expansion of the spring 22, it drops into the water at a point directly below the position of the airplane when the rocket was fired. Thus, it is unnecessary for the operator to anticipate passage of the airplane over a target area, and he simply energizes the igniter 30 when the airplane is directly over the area.

The compression spring 22 serves the dual function of cushioning the application of the motor propelling force to the float light and forcibly separating the motor from the receptacle 12 when the motor is spent. Also, in separating the motor from the receptacle 12, the spring 22 provides a slight additional forward impulse to the float light. The plunger 19 not only permits forward movement of the motor toward the float light against the spring 22, under the initial impulse of the motor, but also actuates the firing pin 15 to fire the detonating cap 14.

We claim:

1. A rocket device comprising a payload, a rocket motor to the rear of the payload, a releasable connection between the payload and the motor including a pair of members movable relatively in one direction to accommodate forward movement of the motor toward the payload when the motor is fired, an operating element carried by the payload, means actuated by movement of one of said members for initiating operation of said element, and means for moving said members relatively in the opposite direction, upon a decrease in the propelling force of the motor, and thereby forcibly separating the motor from the payload.

2. A rocket device comprising a container adapted to receive a combustible charge and having a cylinder in its rear end portion, a rocket motor to the rear of the container, a releasable connection between the motor and the container including a plunger adapted to be connected to the motor, slidable into the cylinder to accommodate movement of the motor toward the container and to permit the forwardly moved motor to so remain during the firing of the motor, a percussion cap operable to fire into the container to initiate combustion of the charge, a firing pin in the cylinder actuated by the plunger to fire the cap and means for separating the motor from the container during the initial flight of the device upon a decrease in the propelling force of the motor.

3. A rocket device comprising a container adapted to receive a combustible charge and having a cylinder in its rear end portion, a rocket motor to the rear of the container, a releasable connection between the motor and the container including a plunger adapted to be connected to the motor, to be slidable into the cylinder to accommodate movement of the motor toward the container and to permit the forwardly moved motor to so remain during the firing of the motor, a percussion cap operable to fire into the container to initiate combustion of the charge, a firing pin in the cylinder actuated by the plunger to fire the cap, a spring in the cylinder normally urging the firing pin away from the cap and a second spring positioned between the motor and the container adapted to forcibly separate the motor from the container during the initial flight of the said rocket device upon a decrease in the propelling force of the motor.

4. A rocket device comprising a container adapted to receive a combustible charge and having a cylinder in its rear end portion, a rocket motor to the rear of the container, a releasable connection between the motor and the container including a plunger connected to the motor and slidable into the cylinder to accommodate movement of the motor toward the container when the motor is fired, a percussion cap operable to fire into the container to initiate combustion of the charge, a firing pin in the cylinder actuated by the plunger to fire the cap, and a spring on the plunger opposing said movement of the plunger into the cylinder and operable to move the plunger out of the cylinder, upon a decrease in the propelling force of the motor, and thereby forcibly separate the motor from the container.

5. A rocket device comprising a container adapted to receive a combustible charge, a rocket motor to the rear of the container, a resilient, releasable connection between the motor and the container including a pair of telescoping members one of which is movable into the other and a spring positioned around the one member operable between the motor and the container, a percussion cap adapted to fire into the container to initiate combustion of the charge and a firing pin actuated by the one member to fire the cap, the said resilient, releasable connection adapted to permit a sustained forward movement of the motor with respect to the container during the firing of the motor and to separate the motor from the container during the initial flight of the rocket device upon a decrease in the propelling force of the motor.

CHARLES C. LAURITSEN.
JOHN McMORRIS.

REFERENCES CITED

The following references are of record in the file of this patent:

UNITED STATES PATENTS

| Number | Name | Date |
| --- | --- | --- |
| 562,535 | Hurst | June 23, 1896 |
| 1,879,840 | Brandt | Sept. 27, 1932 |
| 2,315,145 | Wauters | Mar. 30, 1943 |

FOREIGN PATENTS

| Number | Country | Date |
| --- | --- | --- |
| 16,795 | Great Britain | Mar. 27, 1919 |
| 102,699 | Great Britain | Dec. 21, 1916 |
| 305,160 | Germany | Mar. 3, 1920 |